United States Patent

[11] 3,612,515

| [72] | Inventor | Emory K. Bergeson<br>St. Louis Park, Minn. |
|---|---|---|
| [21] | Appl. No. | 855,161 |
| [22] | Filed | Sept. 3, 1969 |
| [45] | Patented | Oct. 12, 1971 |
| [73] | Assignee | Pako Corporation<br>Minneapolis, Minn. |

[54] DEVICE FOR COLLECTING, IDENTIFYING AND STACKING FILM PIECES
4 Claims, 6 Drawing Figs.

[52] U.S. Cl. .................................................. 271/86, 193/2
[51] Int. Cl. ....................................................B65h 31/22, B65h 31/24
[50] Field of Search........................................... 193/2, 8; 271/86, 64, 63

[56] References Cited
UNITED STATES PATENTS

| 1,573,414 | 2/1926 | Mahoney...................... | 271/86 |
| 2,076,391 | 4/1937 | Whitehead.................... | 271/64 |
| 2,124,858 | 7/1938 | Marchand..................... | 271/86 |
| 3,083,011 | 3/1963 | Saul............................. | 271/26 |
| 3,154,356 | 10/1964 | Lewis et al.................... | 271/86 X |

OTHER REFERENCES
In Encyclopedia of Chemical Technology, ed. by R. E. Kirk and D. F. Othmer. N.Y. 1953 Interscience Publishers Inc. Volume II, pp. 439, 453, 458, 459. 1953

*Primary Examiner*—Joseph Wegbreit
*Assistant Examiner*—Bruce H. Stoner, Jr.
*Attorney*—Wicks & Nemer

ABSTRACT: The disclosure includes a device for collecting, identifying and stacking film pieces delivered from a film processing machine having a chute for receiving film pieces and formed with stop means at the lower end thereof, means for supporting the chute on the machine at an oblique angle to the vertical to receive film pieces delivered from the machine together with means for substantially eliminating static electricity from film pieces delivered from the machine on the chute.

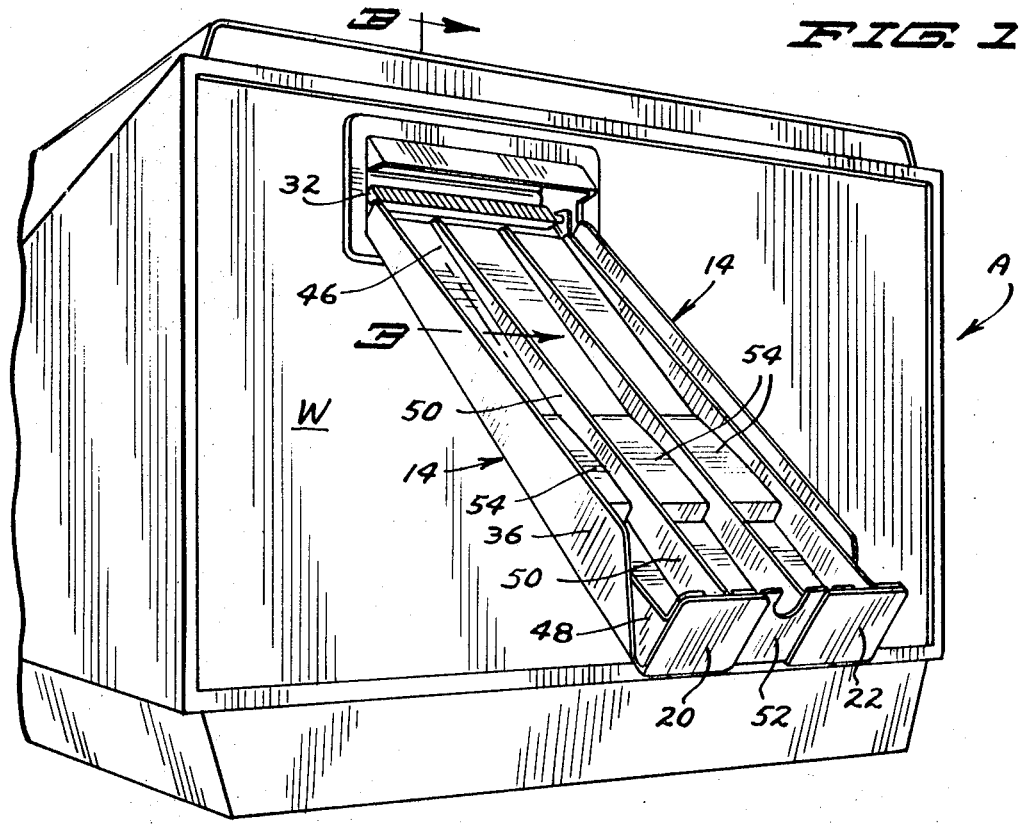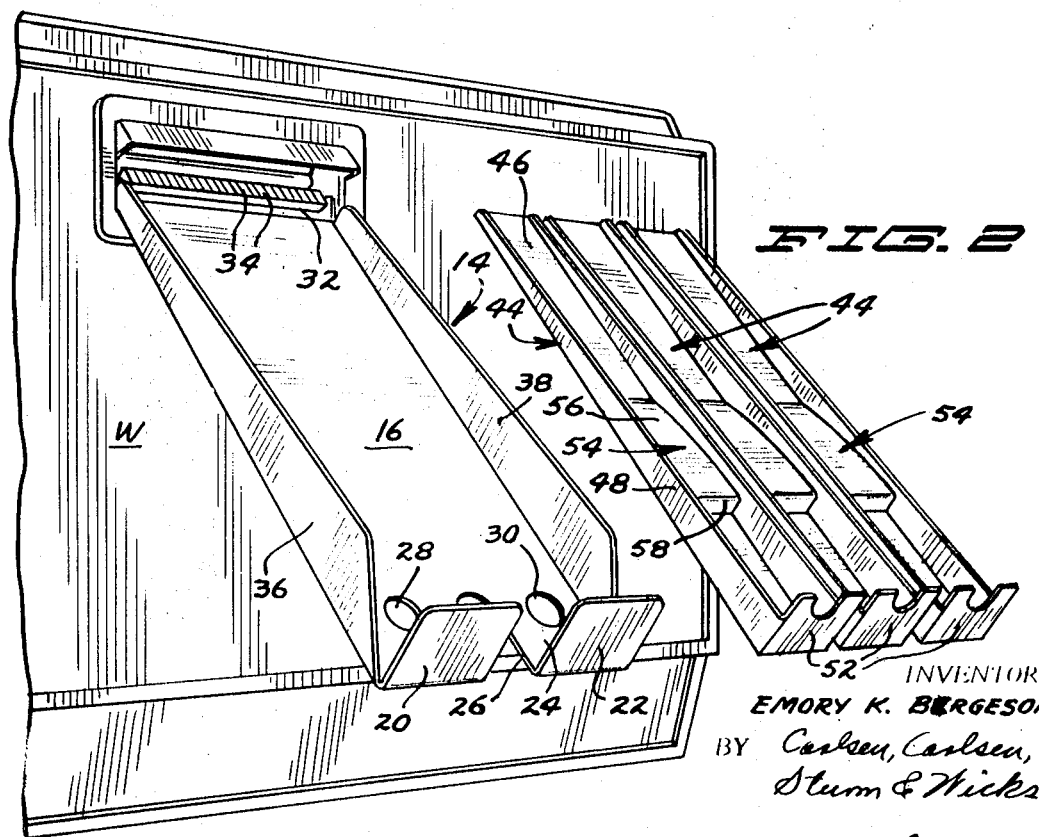

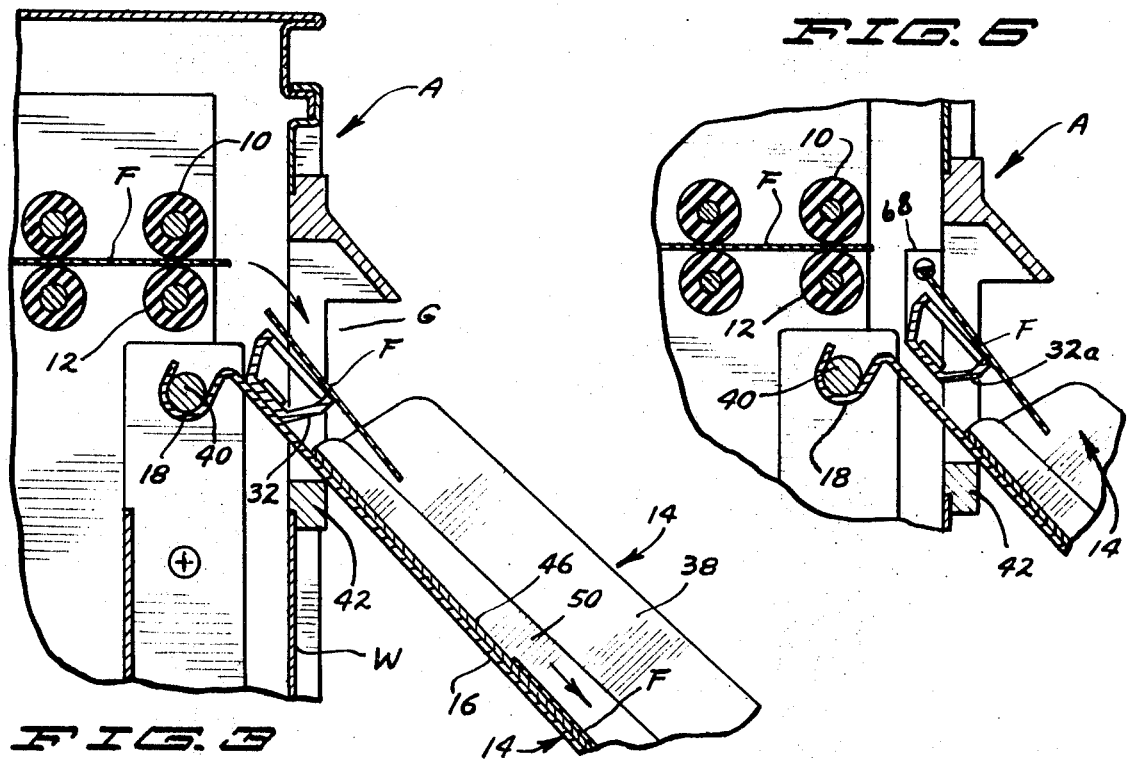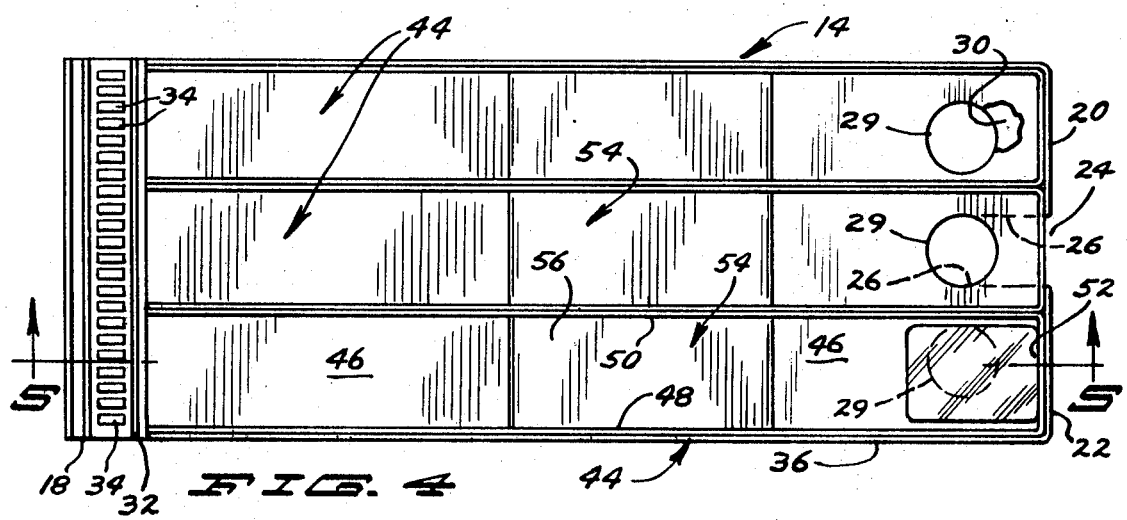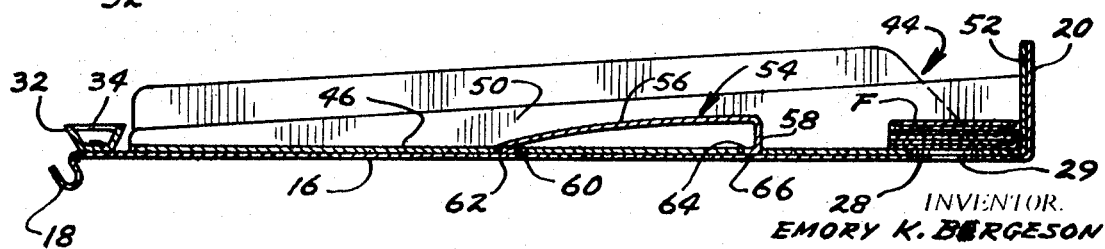

3,612,515

DEVICE FOR COLLECTING, IDENTIFYING AND STACKING FILM PIECES

SUMMARY OF THE INVENTION

The invention relates to a device for collecting, identifying and stacking film pieces such as periapical film used by dentists and delivered from a film processing machine. As film pieces are transported through a film processing machine the same pick up a charge of static electricity and with this charge the same tend to adhere to a chute accepting the same. This fact, coupled with the light weight of small film pieces results in the film pieces not sliding on the chute to the bottom where the same can be stacked in sequence and identified.

The present invention includes a film receiving and collecting chute having support means therefor and a bar which mounts strips of material having particles of polonium thereon. The bar is in the path of the film pieces proceeding to the chute and the polonium on the bar quickly ionizes the air through which the film piece travels which in turn dissipates the static charge in the film piece. As a result the film piece slides freely down the chute where it strikes stop means thereon. To cause the film pieces to stack at the lower end of the chute a ramp is provided on the bottom of the chute located at a position spaced from the lower end of the chute. Due to gravity the film piece slides down the chute and upon the ramp which elevates the film piece above the bottom of the chute. In being so elevated the film piece leaves the end of the ramp and drops upon a film piece previously deposited from the end of the ramp and upon the lower end of the chute thereby effecting a stacking of the film pieces. The support means for the chute is in the form of a tray connectable with the film processing machine and which may hold three identical chutes to simultaneously receive film pieces from three points of egress from the film processing machine. These points of egress correspond in alignment with points of entry of the film pieces into the machine thus providing positive identification of the film. In other words, a number of film pieces on a given patient deposited at a given point of entry in a machine will be deposited in a corresponding chute at a point of egress of the film from the machine. The deposited group thereby forms an identification of the film pieces of the given patient. This is true with respect to each of a series of chutes.

These and other more detailed and specific objects will be disclosed in the course of the following specification, reference being had to the accompanying drawings, in which FIG. 1 is a perspective view of the end of a film developing machine on which the film collecting, identifying and stacking device embodying the invention is attached.

FIG. 2 is a view similar to FIG. 1 in which the individual trays are shown as removed from the tray support.

FIG. 3 is a sectional view taken on the line 3—3 of FIG. 1.

FIG. 4 is a top plan view of the device.

FIG. 5 is a sectional view taken on the line 5—5 of FIG. 4.

FIG. 6 is a sectional view similar to FIG. 3 showing a further embodiment of the static collecting member.

Referring to the drawings in detail, FIGS. 1, 2 and 3 show an end portion of a machine A for developing exposed film particularly of the small type used by dentists in taking X-rays of the teeth of a patient. The exposed film pieces are fed into the machine A at the end (not shown) and in the machine a multiplicity of rollers transport the film pieces progressively through developing solutions and a drier. The developed film pieces F are then ejected from the machine through the opening G by the last of the rollers 10 and 12 (particularly FIG. 3). As the film is passed through the machine it picks up static electricity.

The invention herein presented is the film collecting, identifying and stacking device C which collects, stacks and identifies the film pieces F as the same are ejected from the machine A while at the same time removing the static electricity from the film. With the film pieces charged with static electricity as the same are ejected from the machine A, the film pieces tend to stick to a collecting chute. Some of the film pieces collect more static electricity than others, therefore the rate and distance of slide down a chute varies whereby the same cannot be effectively and easily stacked at the bottom of a chute.

The film collecting, identifying and stacking device C includes the support tray 14. The support tray includes the bottom 16 on the upper end of which is formed the hook 18. The lower end of the bottom is formed with the spaced end wall portions 20 and 22 which provide an access opening 24. Communicating with the access opening 24 is the slot 26 formed in the bottom 16. The bottom 16 is also formed with the access holes 28 and 30.

Secured to the upper end of the bottom 16 is the support in the form of the bar 32 which mounts the transverse strips 34 of material containing polonium particles. There is no claim made to the bar 32 and the polonium strips 34, per se. The radiation emitted from the polonium strips is called alpha radiation and is harmless externally. The alpha rays travel through the air very rapidly but have no power to penetrate the skin. As the rays travel through the air they produce an ionization, and it is this ionized air that dissipates the static charges in the film pieces F as the film pieces travel over the strips 34. With the static charges dissipated the film pieces slide easily on the chute hereinafter described and with the easy sliding action are stacked at the bottom thereof as described.

The numeral 36 designates a first sidewall on the bottom 16 which extends substantially from the upper end of the bottom 16 to the end wall portion 20 of the support tray 14. Further provided is a second sidewall 38 on the bottom 16 which extends substantially from the upper end of the bottom 16 to the end wall 22. The hook 18 of the support tray 14 is engaged under the rod 40 of the machine A with the bottom bearing upon the bar 42 positioned at the lower extend of the opening O of the wall W of the machine A whereby the support tray 14 is supported at an angle to the vertical as shown in FIGS. 1, 2 and 3.

The numeral 44 designates a chute, and the chute includes a bottom 46, an upstanding first sidewall 48 along one edge of the bottom. Also provided is a second sidewall 50, both sidewalls extending the length of the bottom 46 with the walls progressively wider from the top to the bottom. The walls 36 and 38 of the support tray are similarly progressively wider from the top to the lower end walls 20 and 22. The numeral 52 designates a lower upstanding end stop wall connected to the bottom 46 and sidewalls 48 and 50 of the chute. The walls 48 and 50 of the chute provide guidance of the film pieces if necessary to the stop wall 52.

FUrther provided is the ramp 54 which is formed of the slightly arcuate top portion 56 from which depends the lower end portion 58. The ramp 54 extends substantially from the sidewall 48 to the wall 50 and is positioned intermediate the ends of the bottom 46 of the chute. The upper end of the ramp 54 is secured by an ear 60 extending from the upper end of the top 56 and positioned through a small hole 62 formed in the bottom 46 and bent upon the bottom. The lower edges of the end portion 58 of the ramp has formed thereon the ear 64 which extends through the hole 66 formed in the bottom 46 and bent upon the bottom. Each chute is formed with an access hole 29 formed in the bottom thereof adjacent wall 52.

The support tray 14 is wide enough to accommodate three identical chutes 44, and the access hole 28 allows the operator's finger to be inserted therethrough and through the hole 29 of the chute to push up the stack of film pieces collected at and overlying the holes. Access hole 30 is similarly used for a chute overlying the same, and the slot 26 is used as a finger access to push up film pieces overlying the slot 26 and a hole 29 of a chute.

In the operation of the device the following occurs. The film piece F is discharged from the rollers 10 and 12 of the machine A and the bar 32 is so positioned that the film F is directed onto the bar where the strips containing polonium dissipate the static electricity built up in the film F due to its travel through the rollers of the machine A where the film is processed and dried. The film moves onto the bottom 46 of a given chute, and due to gravity the film F slides downwardly to the ramp 54. The film F slides upon and down the ramp which elevates the film above the bottom 46. The film F then drops off the end of the ramp onto the bottom 46 and slides to a position against the end wall 52. The next film F travels as above and from the ramp 54 is projected to a position on top of the first-mentioned film F in stack form also against the end wall 52. As a result the film pieces F are stacked in the chute 44 in the same sequence as the same were fed into the machine A. In use of the device a series of X-ray films F are taken, for example, of a patient's mouth. The films F are then fed through the machine and ultimately stacked as described above. Upon completion of the stacking of a series of films F on a given patient an identification tab is also put through the machine which winds up stacked upon the series of stacked films which identifies the stack with a given patient and separates the stack from a subsequent stack upon the same. This provides a further means of identification of the series of films for a patient upon a series of films of another patient.

In the embodiment of FIG. 6 the bar 32a is identical to bar 32, but the same is mounted on a pair of brackets 68 secured to the sidewalls of the opening G of the machine A whereby the bar is in the path of travel of the film pieces as the same emerge from the machine. The bar 32a removes static electricity from the film pieces in the manner described above.

Having now therefore fully illustrated and described my invention, what I claim to be new and desire to protect by Letters Patent is:

1. A device for collecting, identifying and stacking film pieces delivered from a film processing machine comprising:
   a. a chute having a rectilinear bottom and stop means at the lower end thereof and at a right angle thereto,
   b. means mounting polonium adjacent the upper end of the chute for substantially eliminating static electricity from film pieces delivered from the machine to the chute, and
   c. tray means supporting said chute removably therein and means for supporting the tray means on the machine at an oblique angle to the vertical to receive film pieces delivered from the machine and cause the same to slide to the stop means.

2. The device of claim 1 in which said chute has
   a. a ramp thereon intermediate the ends of the bottom of the chute whereby film pieces stack between said ramp and said stop means,
   b. said ramp having a top inclining upwardly from said chute bottom to an end portion at the lower end of the ramp top.

3. A device for collecting, identifying and stacking film pieces delivered from a film processing machine comprising:
   a. a multiplicity of chutes in horizontal side-by-side relationship each chute having a rectilinear bottom and stop means at the lower end thereof,
   b. means adjacent the upper ends of the chutes for substantially eliminating static electricity from film pieces delivered from the machine to the chutes, and
   c. tray means supporting said multiplicity of chutes on the machine at an oblique angle to the vertical to receive film pieces from a multiplicity of film egress points on the machine and cause the same to slide to the stop means of the chutes,
   d. each of said chutes formed with a ramp thereon intermediate the ends thereof whereby film pieces stack between said ramp and said stop means.

4. A device for collecting, identifying and stacking film pieces delivered from a film processing machine comprising:
   a. a chute having a rectilinear bottom, sidewalls and stop means at the lower end thereof,
   b. said chute having a ramp on said bottom intermediate the ends thereof whereby film pieces stack between said ramp and said stop means,
   c. said ramp having a top inclining upwardly from said chute bottom to an end portion at the lower end of the ramp,
   d. means supporting said chute on the machine at an oblique angle to the vertical to receive film pieces delivered from the machine and cause the same to slide over the ramp and to the stop means.